United States Patent
Dilley et al.

[19]

[11] Patent Number: 5,943,335

[45] Date of Patent: Aug. 24, 1999

[54] METHOD FOR MINIMIZING CALL SETUPS IN ISDN PBX SYSTEMS

[75] Inventors: Selena Dilley; Mieu-Hong Dang; Harry Yen, all of San Jose, Calif.

[73] Assignee: Siemens Information and Communication Networks, Inc., Boca Raton, Fla.

[21] Appl. No.: 08/672,896

[22] Filed: Jun. 28, 1996

[51] Int. Cl.[6] .................................................. H04J 3/02
[52] U.S. Cl. ......................... 370/360; 370/463; 370/420; 379/156
[58] Field of Search ..................................... 370/420, 463, 370/421, 359, 360, 380, 381, 382, 384, 386, 351, 357, 522, 462, 524; 379/100.12, 219, 201, 156, 165, 166, 224, 225, 234, 242, 258, 231, 268, 269, 271, 272, 273, 333, 172, 173

[56] References Cited

U.S. PATENT DOCUMENTS

| 5,315,595 | 5/1994 | Allouis et al. ........................... 370/421 |
| 5,453,984 | 9/1995 | Mueller ................................... 370/421 |
| 5,455,824 | 10/1995 | Okayama et al. ....................... 370/420 |
| 5,657,381 | 8/1997 | Hughes-Hartogs ................. 379/100.12 |

*Primary Examiner*—Huy D. Vu

[57] ABSTRACT

A method for operating an ISDN PBX[110] for connecting M BRI lines[13–15] connected to a central office[12] to N terminals[21–28, 31–38, 41–48] connected to the PBX[110] (N>M), such that any B channel of any of the BRI lines [13–15] can be connected to any terminal utilizing a connect in accordance with Bellcore National Standard NI-2. Each of the terminals[21–28, 31–38, 41–48] is associated with one, and only one, of the BRI lines[13–15]. The present invention achieves its advantages over the prior art by defining a plurality of EKTS groups[1–4]. Each of the EKTS groups [1–4] includes at least one of the terminals[21–28, 31–38, 41–48] associated with each of the BRI lines[13–15]. When an incoming call is received for a terminal associated with a BRI line that is currently busy, the call is connected by emulating a connection to a second terminal that is assigned to free BRI line and which is also assigned to the EKTS group to which the first terminal is assigned. In the preferred embodiment of the present invention, the number of EKTS groups[1–4] is the smallest integer that is greater than, or equal to, N/(2 M).

6 Claims, 3 Drawing Sheets

METHOD FOR MINIMIZING CALL SETUPS IN ISDN PBX SYSTEMS

FIELD OF THE INVENTION

The present invention relates to telephone systems, and more particularly, to the management of multiple ISDN lines in a public branch exchange (PBX).

BACKGROUND OF THE INVENTION

Single integrated services digital network (ISDN) lines provide an intermediate solution for users in need of digital services having a capacity greater than that of conventional telephone subscriber lines, but less than that of a T1 connection. PBX systems for managing the connection of a plurality of ISDN terminals to one or more ISDN lines are known to the art. The Bellcore National Standard (NI-2) sets out a system that supports 8 terminals, each with it own "telephone number" on a single basic rate interface (BRI). Typically, a single BRI line is used to connect a central office to a network terminator. The network terminator is then connected to each of up to eight terminals. Any of the 8 terminals can be connected to the BRI through the network terminator. The central office assigns an individual "telephone number" to each terminal. Since a BRI line has two B-channels that can be connected to different terminals, this arrangement allows any two of the eight terminals to receive or make calls via the network terminator simultaneously.

While this arrangement is well suited for an 8 terminal system on a single BRI line, difficulties arise when one wishes to connect several BRI lines to a PBX which services more than 8 terminals. Consider an arrangement in which a PBX is connected to 3 BRI lines, and the PBX connects these lines to 24 terminals. From the telephone central office's point of view, the PBX appears to be three separate network terminators, each connected to 8 terminals. Consider three network terminals that the central office views as being connected to the same 8 terminal group. If two of these terminals are using the corresponding BRI line and a call comes for the third terminal, the caller will be given a busy signal, even if the other BRI lines connected to the PBX are free.

One method for preventing this apparent busy line situation is to utilize electronic key telephone systems (EKTS) groups. All of the terminals in an EKTS group are notified of an incoming call for any one of the terminals in the group. In the normal utilization of this feature, the inbound call rings on the identified terminal; however, the call is also displayed without ringing on the other terminals in the group. This feature was originally implemented to allow for phone backup within an office work group. Each member of the work group would be placed in the same EKTS group. The terminals of all members display all of the numbers associated with the group. An inbound call for one of the members of the work group would then be displayed on the telephones of all of the members of the work group. If the intended party did not pickup the call, one of the members of the work group could answer the call from his or her phone.

In the case of the above described PBX, all 24 terminals would be defined as being part of the same EKTS group. Hence, each time a call is received for a terminal on a busy BRI line, the PBX will still receive call setups for the work group members on the unused BRI lines. The PBX can then connect the call to original terminal, if that terminal is free, by emulating a connection to one of the terminals the central office identifies with a free BRI line.

While this technique solves the problem of allowing any terminal to use any BRI line connected to the PBX, the PBX must deal with 24 call setups each time an inbound call is received. The time needed to process these call setups is significant and places undesirable constraints on the PBX controller.

Broadly, it is the object of the present invention to provide an improved ISDN PBX system.

It is a further object of the present invention to provide an ISDN PBX system that allows any terminal connected thereto to be connected to any ISDN line connected thereto without the need to receive one call setup for each terminal each time a call is received for any terminal connected to the PBX.

These and other objects of the present invention will become apparent to those skilled in the art from the following detailed description of the invention and the accompanying drawings.

SUMMARY OF THE INVENTION

The present invention is a method for operating an ISDN PBX for connecting M incoming BRI lines from a central office to N terminals connected to the PBX (N>M), such that any B channel of any of the BRI lines can be connected to any terminal utilizing a connection in accordance with Bellcore National Standard NI-2. Each of the terminals is associated with one, and only one, of the BRI lines. The present invention achieves its advantages over the prior art by defining a plurality of EKTS groups. Each of the EKTS groups includes at least one of the terminals associated with each of the BRI lines. In embodiments having 2 B-channels, each EKTS group includes at least two of the terminals associated with each of the BRI lines. When an incoming call is received for a terminal associated with a BRI line that is currently busy, the call is connected by emulating a connection to a second terminal that is assigned to free BRI line and which is also assigned to the EKTS group to which the first terminal is assigned. In the preferred embodiment of the present invention, the number of EKTS groups is the smallest integer that is greater than, or equal to, $N/(2M)$.

DETAILED DESCRIPTION OF THE INVENTION

Figure 1:
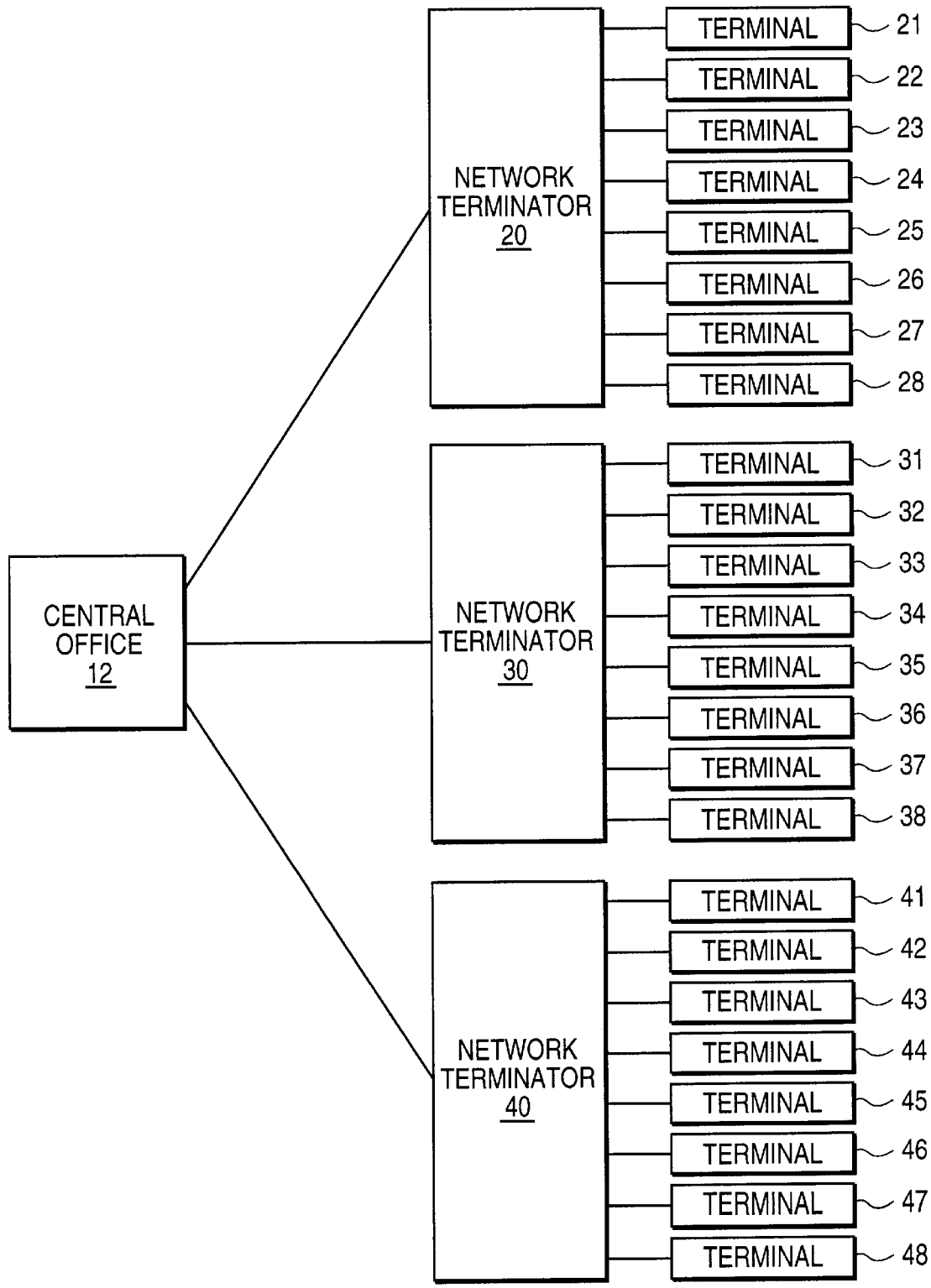
FIG. 1 is a block diagram illustrating the connection of 24 terminals to a central office in the manner contemplated by the NI-2 standard.

The present invention may be more easily understood with reference to FIG. 1 which is a block diagram illustrating the connection of 24 terminals to a central office in the manner contemplated by the NI-2 standard. Each group of 8 terminals is connected to a network terminator which interfaces those 8 terminals to central office 12. Terminals 21–28 are connected via network terminator 20 and BRI line 13; terminals 31–38 are connected via network terminator 30 and BRI line 14, and terminals 41–48 are connected by network terminator 40 and BRI line 15.

Figure 2:
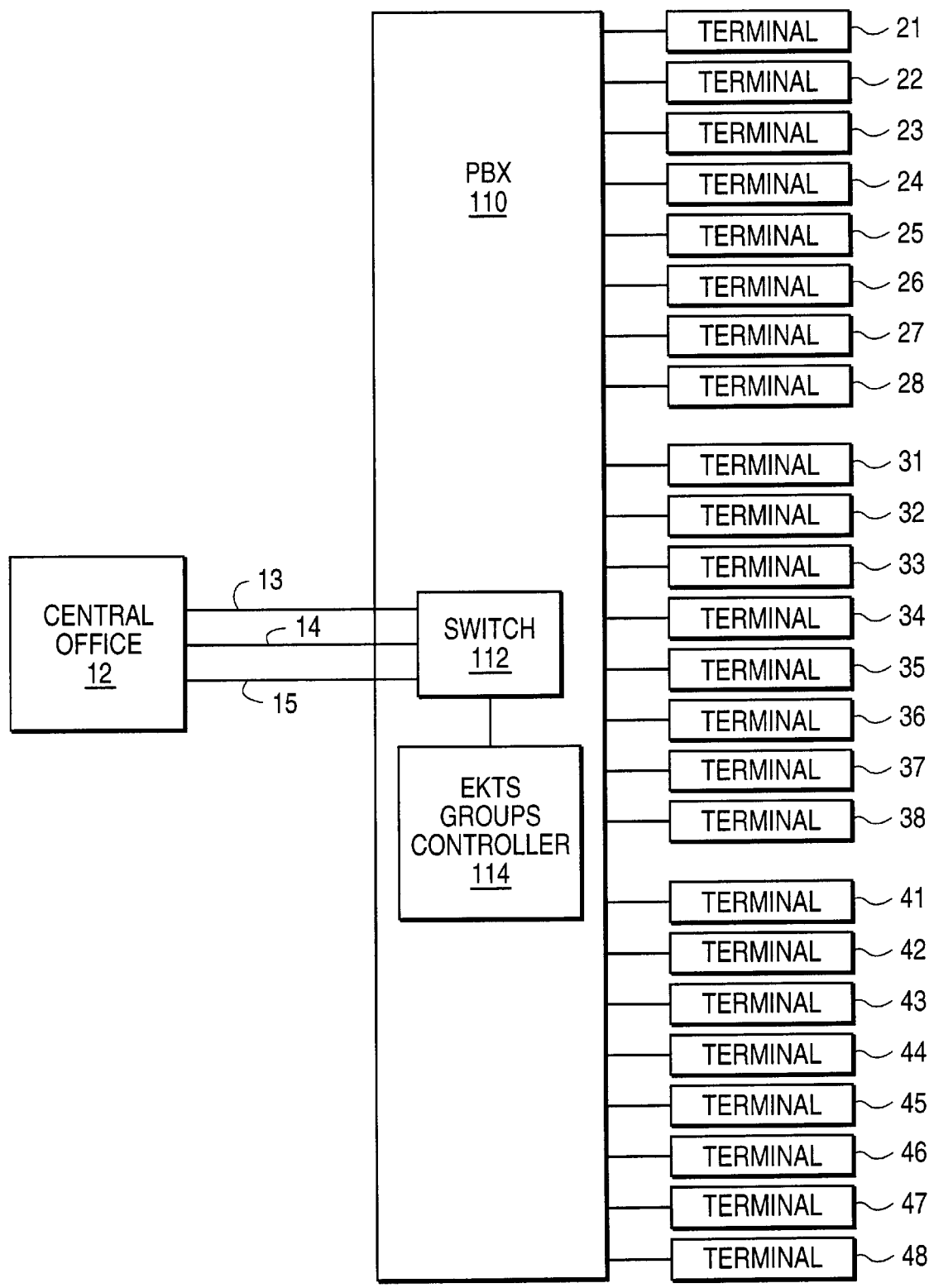
FIG. 2 is a block diagram illustrating the connection of the 24 terminals shown in FIG. 1 to a central office via a PBX according to the present invention

Refer now to FIG. 2 which is a block diagram illustrating the connection of the 24 terminals shown in FIG. 1 to central office 12 via a PBX 110 according to the present invention. PBX 110 includes a switch 112 that provides the means for connecting any of the terminals to any of the BRI lines, and a controller 114 which controls switch 112 in response to signals received from the terminals or the central office on the D channels of the BRI lines. To simplify the drawing, the individual connections between the terminals and switch 112 have been omitted from this drawing.

Figure 3:
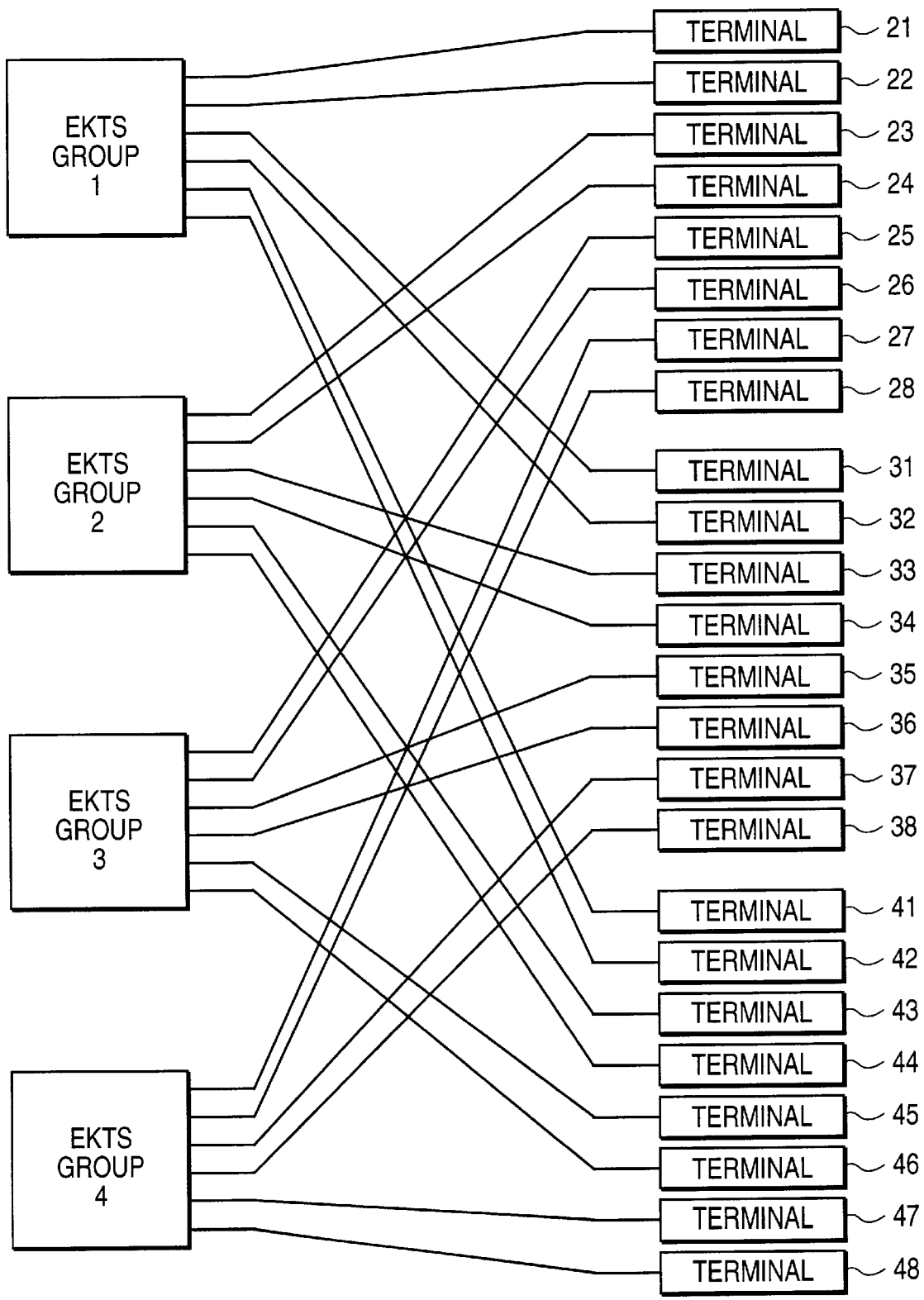
FIG. 3 is block diagram showing the assignment of the 24 terminals shown in FIG. 2 to the 4 EKTS groups.

The 24 terminals are grouped into 4 EKTS groups that are registered with the central office when the service profile identifiers (SPID) are defined for each of the terminals. The identity of the terminals in each of the EKTS groups is stored in tables in controller 114 as well as in central office 12. The assignment of the 24 terminals shown in FIG. 2 to the 4 EKTS groups is shown in FIG. 3. The central office associates a BRI line with each of the terminals, since the central office views the PBX as if it were 3 separate network terminators. At the hardware level, the central office associates a port which it views as being connected to a network terminator via the BRI line and a terminal endpoint identifier defining which of the 8 terminal connections is used to connect the terminal to the central office. Hence, each terminal belongs to two groups, the group defined by port associated with a BRI line and the group defined by the EKTS group to which it belongs.

Consider an inbound call for terminal 22, and assume that terminal 22 is not busy; however, BRI line 13 is busy. This call would normally be received on BRI line 13. The central office will generate 6 call setups for this call, one for each member of EKTS group 1. Controller 114 also keeps track of which terminals and BRI lines are busy. When controller 114 receives these call setups and determines that a connection is possible through a different BRI line, controller 114 makes the connection and signals the central office that the call was picked up by one of the other terminals in the EKTS group associated with terminal 22. For example, assume that the call is to be received on line 14, which is currently free. Controller 112 signals the central office that terminal 31 has taken the call. The central office routes the call via BRI line 14 which is the BRI line that the central office associates with terminal 31. Controller 114 then causes switch 12 to connect BRI line 14 to terminal 22.

In the general case of N terminals that are to be connected to the central office via M BRI lines, the number of EKTS groups needed to minimize the number of call setups is the smallest integer that is greater than, or equal to, N/(2 M). If fewer EKTS groups are defined, the system will still operate; however, the number of call setups that must be processed will be greater than with the preferred embodiment of the present invention which utilizes the above described relationship to determine the number of EKTS groups.

Each EKTS group must include at least one terminal that is associated with each of the BRI lines to allow any terminal to be connected to any BRI line. In the preferred embodiment of the present invention, each EKTS group includes two terminals associated with each of the BRI lines to make full use of the 2 B channels associated with each line.

It should be noted that a call initiated by a terminal connected to the PBX is assigned a BRI line by the PBX. Hence, these calls are handled in the conventional manner without the need to emmulate a connection to another terminal.

Various modifications to the present invention will become apparent to those skilled in the art from the foregoing description and accompanying drawings. Accordingly, the present invention is to be limited solely by the scope of the following claims.

What is claimed is:

1. An integrated services digital network (ISDN) private branch exchange (PBX) for connecting M basic rate interface (BRI) lines connected to a central office to N terminals, where N>M, such that any B channel of any of said BRI lines can be connected to any of said terminals even though each of said terminals is associated in the central office with one, and only one, of said BRI lines, said PBX comprising:

a switch for connecting each of said terminals to each of said BRI lines;

control means for causing said switch to connect one of said terminals to one of said BRI lines in response to signals received from said central office specifying that terminal; and means for storing information specifying a plurality of electronic key telephone systems (EKTS) groups, each of said terminals being assigned to one of said EKTS groups, wherein each of said EKTS groups includes at least one terminal associated with each of said BRI lines, and wherein said control means causes said switch means to connect an incoming call for a first terminal via one of said BRI lines that is not associated with said first terminal by emulating a connection to a second terminal that is assigned both to that BRI line and also to the same EKTS group to which said first terminal is assigned.

2. The PBX of claim 1 wherein the number of EKTS groups[1–4] is the smallest integer that is greater than, or equal to, N/(2 M).

3. In a private branch exchange (PBX) for connecting N terminals to M integrated services digital network (ISDN) basic rate interface (BRI) lines connected to a central office in which each of said terminals is associated with one, and only one, of said BRI lines, and N>M, said PBX including a switch for connecting each of said terminals to each of said BRI lines and a controller for causing said switch to connect one of said terminals to one of said BRI lines in response to signals received from said central office specifying that terminal, the improvement comprising:

means for storing information specifying a plurality of electronic key telephone systems (EKTS) groups, each of said terminals being assigned to one of said EKTS groups, wherein each of said EKTS groups includes at least one terminal associated with each of said BRI lines, and wherein said control means causes said switch means to connect an incoming call for a first one of said terminals via one of said BRI lines that is not associated with said first one of said terminals by emulating a connection to a second terminal that is assigned both to that BRI line and also to the same EKTS group to which said one of said terminals is assigned.

4. The PBX of claim 3 wherein the number of EKTS groups[1–4] is the smallest integer that is greater than, or equal to, N/(2 M).

5. A method for operating an integrated services digital network (ISDN) private branch exchange (PBX) for connecting M basic rate interface (BRI) lines connected to a central office to N terminals connected to said PBX, where N>M, such that any B channel of any of said BRI lines can be connected to any terminal, each of said terminals being associated in said central office with one, and only one, of said BRI lines, said method comprising the steps of:

defining a plurality of electronic key telephone systems (EKTS) groups, each of said EKTS groups including at least one of said terminals associated with each of said BRI lines; and connecting an incoming call for a first one of said terminals via one of said BRI lines that is not associated with said first one of said terminals by emulating a connection to a second one of said terminals that is assigned both to that BRI line and also to the same EKTS group to which said first one of said terminals is assigned.

6. The method of claim 5 wherein the number of EKTS groups[1–4] is the smallest integer that is greater than, or equal to, N/(2 M).

* * * * *